United States Patent [19]

Harte

[11] Patent Number: 4,522,599
[45] Date of Patent: Jun. 11, 1985

[54] COMPUTER ASSISTED INSTRUCTIONAL AND TESTING APPARATUS WITH SWITCH CLOSURE AT TWO DIFFERENT DEPTHS

[76] Inventor: J. Richard Harte, 10 W. Concord, Kansas City, Mo. 64112

[21] Appl. No.: 540,636

[22] Filed: Oct. 11, 1983

[51] Int. Cl.³ .............................................. G09B 7/06
[52] U.S. Cl. ................................................ 434/339
[58] Field of Search ............... 434/339, 334, 335, 338, 434/320, 340

[56] References Cited

U.S. PATENT DOCUMENTS

| | | | |
|---|---|---|---|
| 3,106,027 | 10/1963 | Thelen | 434/339 |
| 3,421,231 | 1/1969 | Kane | 434/339 |
| 3,520,074 | 7/1970 | Severin et al. | 434/334 X |
| 3,579,857 | 5/1971 | Lamberson | 434/339 |
| 3,704,337 | 11/1972 | Sims, Jr. et al. | 434/339 X |
| 3,747,229 | 7/1973 | Harte | 434/334 |
| 3,771,240 | 11/1973 | Matui | 434/339 |
| 3,793,469 | 2/1974 | Tarnopolsky et al. | 434/339 |
| 3,902,255 | 9/1975 | Harte | 434/334 |
| 3,949,489 | 4/1976 | Gallucci | 434/338 |
| 3,953,929 | 5/1976 | Hansel | 434/335 |
| 3,955,290 | 5/1976 | Filer | 434/338 |
| 3,964,176 | 6/1976 | Harte | 434/334 |
| 3,973,331 | 8/1976 | Harte | 434/334 |
| 4,010,553 | 3/1977 | Bennett | 434/338 |
| 4,065,858 | 1/1978 | Harte | 434/334 |
| 4,069,597 | 1/1978 | Bigorre | 434/340 |
| 4,114,292 | 9/1978 | Smith | 434/335 |
| 4,118,876 | 10/1978 | Brilakis | 434/335 |
| 4,121,355 | 10/1978 | Kimoto et al. | 434/320 X |
| 4,164,078 | 8/1979 | Goldfarb | 434/335 |
| 4,425,099 | 1/1984 | Naden | 434/339 X |
| 4,453,920 | 6/1984 | Harte | 434/334 |

Primary Examiner—William H. Grieb
Attorney, Agent, or Firm—D. A. N. Chase; Michael Yakimo, Jr.

[57] ABSTRACT

This invention provides students with immediate feedback as to the correctness of their responses by closing electrical switches at two different depths. A holding frame aligns six different sheets in layers, one below the other. The top sheet is an instructional sheet that contains printed questions and answers, and response areas near each answer choice. The second and fifth sheets are elastic and electroconductive and are connected to an electric power source. The third and sixth sheets are nonconductive and contain a grid of through holes. The fourth sheet is elastic and nonconductive, but has strips of elastic and electroconductive material bonded to its upper surface. Other electroconductive strips, at a 90° axis with the above strips, are bonded to the bottom surface, the holding frame. Each individual electroconductive strip is linked to a computer via a switch relay. The same grid provides centers for: each electroconductive strip; the response areas in sheet one; and the holes in sheets two and five. When a stylus is pushed down at a response area in sheet one, it closes two underlying switches by having an electroconductive sheet contact an underlying electroconductive strip. A different pattern of switch closure is attained by downward pressure from a stylus at each different response area. A computer is programmed to remember which response areas are correct and which are incorrect answers, this information is then fed back to the student.

6 Claims, 5 Drawing Figures

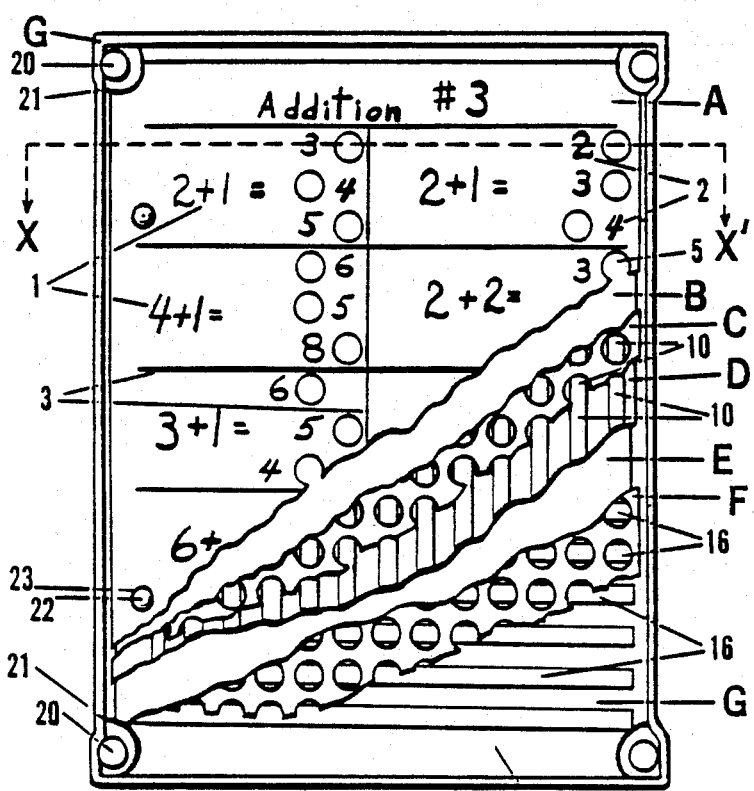
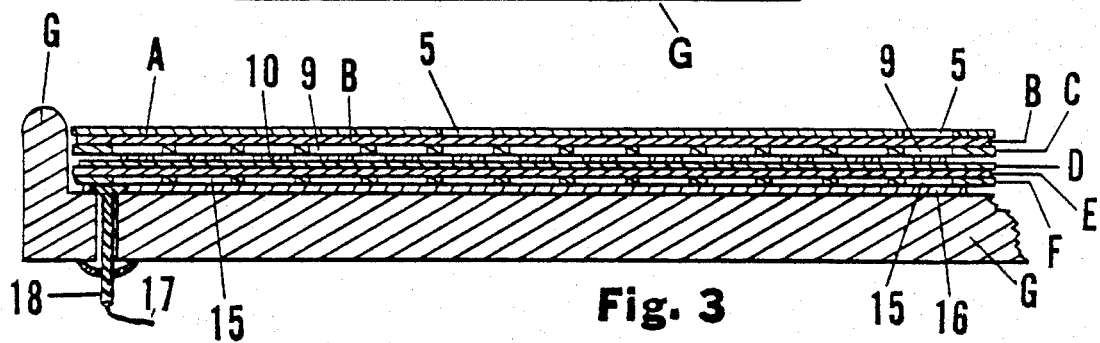
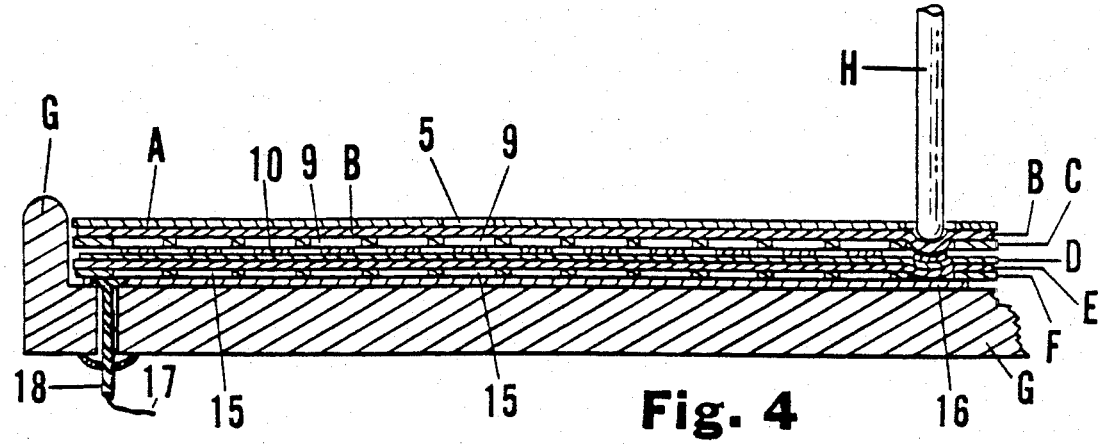

COMPUTER ASSISTED INSTRUCTIONAL AND TESTING APPARATUS WITH SWITCH CLOSURE AT TWO DIFFERENT DEPTHS

PRIOR ART

Thelen U.S. Pat. No. 3,106,027
Severin U.S. Pat. No. 3,520,074
Hansel U.S. Pat. No. 3,953,929
Gallucci U.S. Pat. No. 3,949,489
Filer U.S. Pat. No. 3,955,290
Harte U.S. Pat. No. 3,964,176
Harte U.S. Pat. No. 3,973,331
Bennett U.S. Pat. No. 4,010,553
Harte U.S. Pat. No. 4,065,858
Bigorre U.S. Pat. No. 4,069,597
Smith U.S. Pat. No. 4,114,292
Brilakis U.S. Pat. No. 4,118,876
Itasaka, Tanaka, and Kimura U.S. Pat. No. 4,121,355
Goldfarb U.S. Pat. No. 4,164,078
Harte U.S. Pat. No. 4,453,920
Harte, pending patent application, Instructional and Testing Apparatus with Switch Closure at Two Different Depths, Ser. No. 633,578, filed July 23, 1984.

SUMMARY OF THE DISCLOSURE

This invention is an improvement in instructional and testing apparatus of the type that provide immediate feedback to students as to their correct and incorrect responses, and incorporates a computer as a way of: recording and processing a students responses; sending immediate feedback to the student as to correctness of response; and storing the student's responses in the computer's memory for later evaluation and display to the student or teacher.

In U.S. Pat. No. 4,453,920 and the pending patent application cited above I have illustrated different ways that electronic circuits that are incorporated in a holding frame, and that underlie an instructional sheet that contains response areas in the sheet, can be activated so that a student's correct and incorrect responses can be monitored by a computer.

This invention presents another way that electrical circuits can be closed at two different depths, and that the information that is obtained by the closure of these circuits is then sent to a computer for processing, storage, and feedback to the student by audio or visual means. The present invention is based on the coordinates of a grid pattern, said coordinates remaining the same through successive, top to bottom, layers of material, some layers being electroconductive, and some layers being nonconductive. The coordinate lines of the grid that are horizontal, and run from left to right, the abscissas, will here after be called rows. The coordinate lines of the grid that are vertical, or run from far to near, the ordinates, will here after be called columns.

The top layer of material in this invention is an instructional sheet with response areas printed on the sheet, or punched in the sheet at some of the points of intersection of the rows and columns of the grid. Underlying this instructional sheet is an elastic and electroconductive (here after called conductive) sheet of material that covers the entire grid of coordinates, that is, covers all of the points of intersection of the rows and the columns. Underlying this elastic and conductive sheet is a sheet of nonconductive material that contains through holes at all of the points of intersection of the rows and columns in the grid. Underlying this nonconductive sheet that contains a grid of through holes are strips of elastic and conductive material; one strip being centered under each column in the grid, and these strips are bonded to an elastic and nonconductive sheet of material that covers the entire grid. Underlying this sheet of nonconductive material is a second elastic and conductive sheet of material that covers the entire grid. Underlying this second elastic and conductive sheet of material is a second nonconductive sheet of material that contains a grid of through holes at all of the points of intersection of the rows and columns in the grid. Underlying this second grid of through holes in a nonconductive sheet are strips of conductive material that are centered in rows so that the centers of these strips correspond to the centers of the holes in the overlying grid of holes; and these horizontal strips are bonded to an underlying rigid holding frame. Each of the two elastic and conductive sheets of material is connected to an electric power source. Each of the individual conductive strips of material is connected to a computer by means of a switch relay or other connection.

The points of intersection of the coordinates of the grid are defined by where the centers of the conductive strips that are in rows intersect with with the centers of the conductive strips that are in columns. Certain of these coordinates, or points of intersection of a row with a column are selected as correct response areas. The remaining coordinates, or points of intersection of a row with a column are then designated as incorrect response areas. The computer is then programmed to know and remember which of the coordinates have been selected as correct response areas, and which coordinates have been selected as incorrect response areas.

Instructional sheets that contain multiple choice, true-false, or cross-matching questions and answers are then constructed so that the response areas on these sheets have their centers corresponding to the centers of the coordinates of the grid, and so that the response areas for all correct answers on the instructional sheets correspond to the correct answer area coordinates programmed in the computer, and in a like manner, so that the response areas for incorrect answers on the instructional sheets correspond to the coordinates programmed into the computer as incorrect responses.

When a correctly prepared instructional sheet is then properly positioned on top of the "Computer Assisted Instructional and Testing Apparatus", and when a stylus is pressed in a downward manner or direction at a response area that has been printed on, or punched in an instructional sheet, this downward pressure will cause two underlying electrical circuits to become closed. The closure of the first circuit defines which strip in the strips arranged in columns has been energized by an electric current from the overlying elastic and conductive sheet. The closure of the second circuit defines which strip in the rows of strips has been energized by an electric current from the overlying elastic and conductive sheet. The closure of these two different circuits occurs in a similar member, when an energized elastic and conductive sheet is pressed downward through a hole in a nonconductive sheet to contact an underlying conductive strip. Each individual strip is connected to a computer by a switch relay or by other means. The computer has been programmed to know and remember which points of intersection of a row with a column are correct responses, and which are incorrect responses.

When this apparatus is used as a teaching machine, information about the correctness or incorrectness of a students responses in immediately fed back to the student, and also retained in the computer's memory for later evaluation and feedback to the student or teacher. When this apparatus is used for testing purposes, the computer is disclosed not to give immediate feedback to the student as to the correctness or incorrectness of their responses.

When this apparatus is used as a teaching machine, the student keeps responding to the answer choices on a given question until he has found the correct answer, and he then moves on to the next question in the sequence. When this apparatus is used as a testing apparatus, the student responds to those answer choices that he believes are correct, and he then moves on to the next question, and responds in a similar manner.

BACKGROUND AND OBJECT OF THE INVENTION

This invention relates to an improvement in instructional and testing apparatus noted in the prior art. In recent years computers and related components have become less expensive. Though much information can be stored in the memory of a computer, those computers that store a large volume of information are still quite expensive. The present invention provides a way to use the memory and processing capacity of a small computer, by expanding the amount of information that can be made available by useing the printed page to present most of the information to be presented to the student. This would make this system less costly for schools or for home use. Having a computer linked teaching machine would allow teachers to spend more time in the instructional process, as they would spend less time in grading papers, as a computer print out would tell the teacher how well a student was performing in different subject areas. With proper construction and proper programming of the computer, this "Computer Assisted Instructional and Testing Apparatus" could be made to use the same instructional sheets that are used in the much simpler teaching machines described in the prior art. With this arrangement, each student in a class could have one of the less expensive teaching machines at their desk, and when they think that they have mastered the content on the instructional sheets, they could place these instructional sheets on the "Computer Assisted Instructional and Testing Apparatus" that has been programmed to the "Testing Mode" and respond to the questions. After they have completed a set or a series of instructional sheets, both the student and the teacher could get a print out of the student's performance.

BRIEF DESCRIPTION OF THE DRAWINGS

FIG. 2 is a plan view of this instructional and testing apparatus that has different parts partly cut away to reveal the relationships of the different components.

FIG. 3 is a cross sectional view along line X-X' in FIG. 2, to show the positional relationships of the different components as they are positioned one below the other.

FIG. 4 is identical with FIG. 3, except that it shows how a stylus pressing down at a response area on an instructional sheet can cause two different electric circuits to be closed as two different sets of electroconductive elements contact another element in that set.

DETAILED DESCRIPTION OF THE INVENTION

Figure 1:
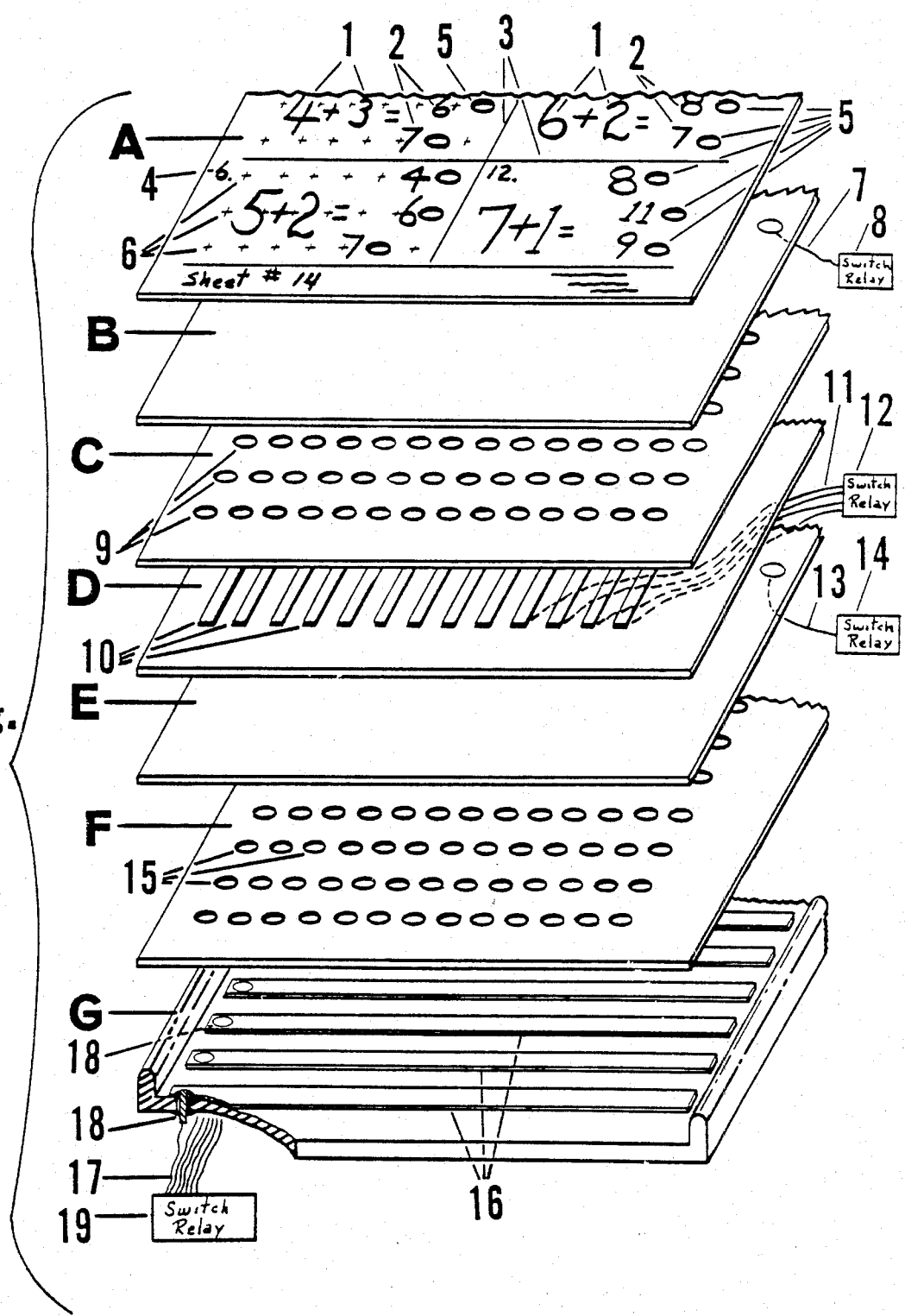
FIG. 1 is an exploded view of the components of this "Computer Assisted Instructional and Teaching Apparatus" and illustrates the positional relationships between these components.

FIG. 1 shows an exploded view of some of the components in this invention, and shows the positional relationships of these components. In FIG. 1, A is an instructional sheet on which are printed a multiplicity of questions 1, and a number of possible correct answer choices 2, for each question. For each question, only one of the possible correct answer choices 2, is correct. The remaining possible correct answer choices 2, for that question are incorrect. Instructional sheet A has printed on it lines 3, which divide this instructional sheet up into separate question and answer areas. Each separate question and answer area is identified by a number 4. Located by each possible correct answer choice 2, is a response area 5, which may be a printed area, or a punched out circular area. When the student thinks he has located a correct answer to a given question 1, he pushes the tip of a stylus down at a response area 5, so as to apply pressure to the sheets of material, and strips of material that are located directly beneath this response area 5. The small crosses 6, shown on instructional sheet A, are in a grid pattern and indicate other possible sites for the location of response areas 5, on other instructional sheets that can be used with this apparatus. This grid of small crosses 6, does not normally appear on instructional sheets A. Small crosses 6, are shown here to illustrate that a wide variety of response areas 5, can be located on an instructional sheet A, and that this allows many different patterns of multiple choice, true-false, and cross matching questions to be prepared and placed on instructional sheets A. Response areas 5, on an instructional sheet A, have the same centers as do the small crosses 6. Instructional sheets are easily removable, and can be quickly replaced with another instructional sheet A, that has a different set of questions and answers, and a different pattern of response areas 5, Sheet B, in FIGS.: 1, 2, 3, 4, and 5, is elastic and conductive; is energized by an electric power source; and covers the entire grid of potential response areas 5, in instructional sheet A. Sheet B is normally permanently held in position within the holding frame and is the top sheet of the "Computer Assisted Instructional and Testing Apparatus" when instructional sheet A, is removed. Sheet B is connected to to switch relay 8, by correcting wire 7. Sheet B is also connected to a power source.

Sheet C, shown in FIGS.: 1, 2, 3, and 4, is nonconductive and has a grid of through holes 9, punched in it. This grid of through holes 9, has the same centers as small crosses 6, and response areas 5, on sheet A.

Sheet D, in FIGS.: 1, 2, 3, and 4, is elastic and nonconductive, and has elastic and conductive strips of material 10, bonded to its upper surface so that the centers of these strips 10, are arranged in columns and have said centers corresponding to the centers of holes 9, in sheet C. Each conductive strip 10, is connected by a wire 11, to a switch relay 12.

Sheet E, shown in FIGS.: 1, 2, 3, 4, and 5, is elastic and conductive; is energized by a power source; and is connected to a switch relay 14, by a wire 13. Sheet E, covers the entire grid of holes 9, and potential response areas 6, that are shown on sheets C. and A.

Sheet F, shown in FIGS.: 1, 2, 3, and 4, is nonconductive, and has a grid of through holes 15, punched in it. These through holes 15, have the same centers as through holes 9, in sheet C.

Holding frame G, is shown in FIGS.: 1, 2, 3, and 4, and has horizontal conductive strips 16, bonded to its upper surface. Conductive strips 16, have centers in common with the centers of through holes 15, in sheet F. Conductive strips 16, are linked to wires 17 by fasteners 18. Wires 17, terminate in individual switch relays 19, with one switch relay 19 being present for each conductive strip 16.

FIG. 2, is a plan view of this instructional and testing apparatus that has different parts partly cut away to reveal the relationships of the different component parts. FIG. 2, also shows corner posts 20, that have a slot 21, at the base of each corner post 20. The four slots 21, each receive one corner of an instructional sheet A, to hold this sheet A, in alignment over the other component parts. FIG. 2, also shows positioning pegs 22, that are permanently a part of the holding frame G; and also shows positioning holes 23, in sheet A, that help the student to be sure that instructional sheet A, is properly positioned on top of the instructional and testing apparatus. Positioning holes 23, are fitted over pegs 22, to assure proper positioning of sheet A, on the remainder of the teaching apparatus.

FIG. 3, is a cross sectional view along broken line X—X' in FIG. 2, to show the top to bottom relationships of some of the component parts in this invention.

FIG. 4, is structurally identical to FIG. 3, except that FIG. 4, shows a stylus H, pressing downward at a response area 5, in sheet A, to deflect a part of elastic and conductive sheet B, downward through a punched out hole 9, in nonconductive sheet C, to make an electrical contact with an electroconductive strip 10, thereby completing an electrical circuit that sends this information to the computer by way of a wire 11, and a switch relay 12. This same downward pressure by stylus H at the same response area 5, also causes elastic and conductive sheet E, to be deflected downward through a hole 15, in sheet F, to contact one of the conductive strips 16, that are bonded to holding frame G. When sheet E, contacts a conductive strip 16, a second electrical contact is made with this same downward pressure on stylus H; and the completion of this second electrical circuit causes this information to be sent to the computer by way of a wire 17, and a switch relay 19.

FIGS. 1, and 2, show that the conductive strips 10, that are arranged in columns form one set of coordinates of a grid, and that the conductive strips 16, that are arranged in rows form the other set of coordinates of a grid. Each point on the grid is defined by the intersection of one of the conductive strips in a row that intersects with one of the conductive strips that is arranged as a part of the column of strips. The wires and relays that go from these strips to the computer relay this exact position to the computer. The computer then compares this set of coordinates with those stored in its memory, and sends back to the student information as to whether his response was correct or incorrect.

Figure 5:
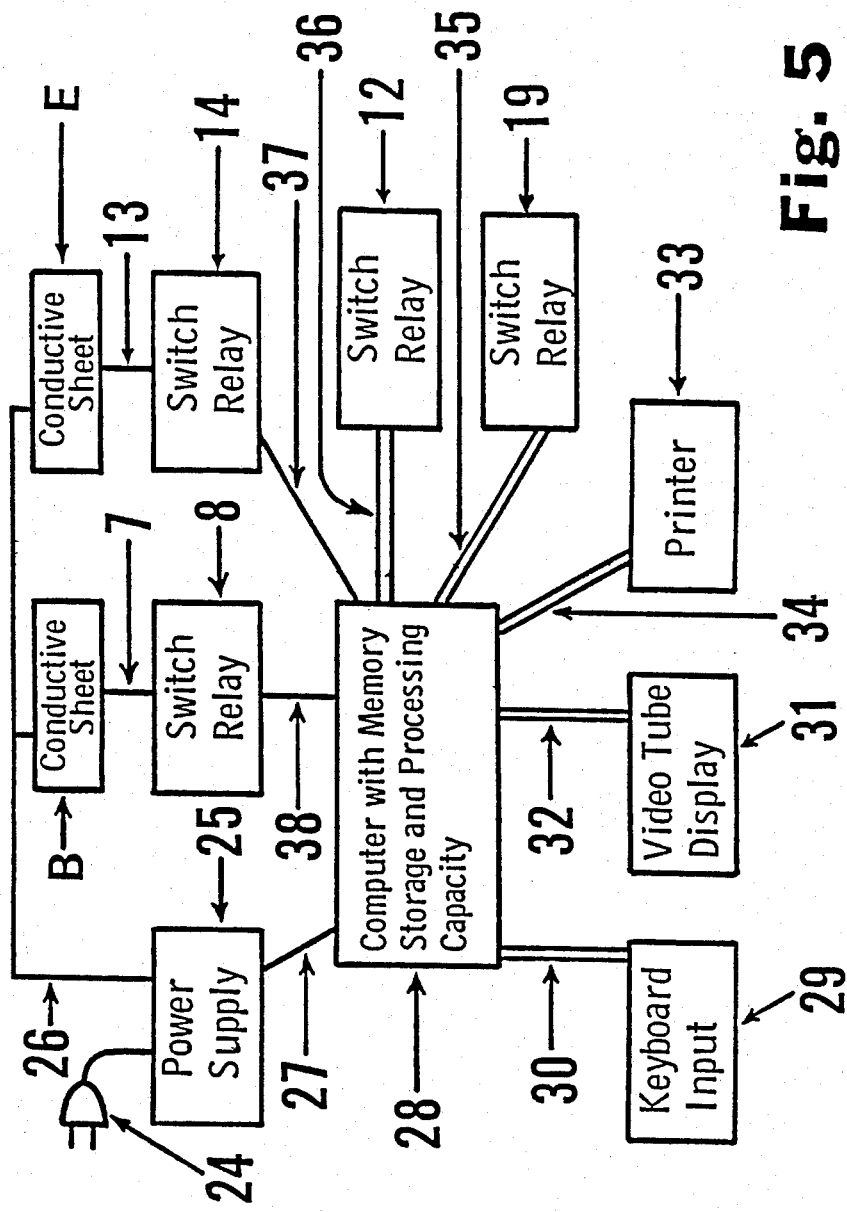
FIG. 5 is a schematic diagram that shows how the different electrical components in this invention are organized.

FIG. 5, is a schematic diagram of some of the electrical components and connections in this invention and shows: conductive sheet B, connected to switch relay 8 by wire 7; conductive sheet E, connected to switch relay 14 by wire 13; and both conductive sheet B, and conductive sheet E, being energized by electric power source 24, and power supply 25, by way of wires 26. Computer 28 recieves its power source by way of cable 27. Switch relays 12, from individual conductive strips 10, send information by way of cable 36 to computer 28 that indicate which of conductive strips 10, have been activated by current from sheet B, when stylus H, has been pushed downward on sheet B, at a response area 5, in sheet A. Switch relays 19, from individual conductive strips 16, send information by way of cable 35, to computer 28, as to which conductive strip 16, has been activated by a current from conductive sheet E, when stylus H is pushed downward at a response area 5, in sheet A. FIG. 5, also shows how computer 28, is linked to keyboard input 29, video tube display 31, and printer 33, by cables 30, 32, and 34. Keyboard input 29, allows the computer operation to be directed and programmed as desired. Video tube display 31, and printer 33, provide feedback functions.

With the above described Computer Assisted Instructional and Testing Apparatus, instructional sheets can be designed to fit the grid pattern that is produced by the intersections of the columns of conductive strips with the rows of conductive strips. It is possible for one computer to contain several programs of correct and incorrect response areas, so that a response area on an instructional sheet that is a correct answer area on one program will be an incorrect answer area on several other and different programs. Instructional sheets will have to have their correct and incorrect response areas keyed to a particular program, and information about this particular program is to be keyed into the computer prior to the use of this particular instructional sheet.

This invention can also be constructed to use instructional sheets that have response areas already punched in them, or printed on the surface of the instructional sheet, said instructional sheets already are being used with a teaching machine cited in the prior art. The computer component of this particular variation of this invention will be programmed to utilize the existing pattern of correct and incorrect response areas used with teaching machines developed under the prior art, namely U.S. Pat. Nos. 3,747,229; 3,964,176; 3,902,255; and 4,065,858.

What is claimed as new in this invention is:

1. An instructional apparatus that gives feedback to the user as to his or her correct or incorrect responses by the use of: a computer that is programmable and is linked to input and output sources; an instructional sheet that contains response areas that represent possible correct answer choices to multiple choice, true-false, or cross matching questions, said response areas being located at some of the coordinates of a grid pattern, said instructional sheet overlying a number of electroconductive and nonconductive components that are held in a holding frame and are organized so that when downward pressure is exerted at any response area, which may be at any of the coordinates of the grid pattern, that two electric circuits are closed by this downward pressure, one of the closed circuits indicating which of the longitudinal coordinates in the grid was energized, and the other circuit that was closed indicating which perpendicular coordinate of the grid was energized; said information as to the two circuits that are closed being sent to the computer by wires, relays, and other appropriate means, said computer having been previously programmed with said grid coordinates to identify some of the coordinates of where the longitudinal and perpendicular coordinates intersect as being correct response areas, and designating the remaining grid coordinates as incorrect response areas, said computer receiving and evaluating this input from the teaching apparatus, and having means sending information immediately back to the user as to correct and incorrect responses.

2. The invention as claimed in claim 1, where the apparatus has a testing mode and retains said information in its memory, and gives this information as to correct and incorrect responses to the tester at a later time on command of the tester.

3. The invention as claimed in claim 1, where response areas are printed on the instructional sheets.

4. The invention as claimed in claim 1, where the response areas are holes punched in the instructional sheets.

5. The invention as claimed in claim 1, where the electroconductive elements that define the longitudinal and perpendicular coordinates of the grid pattern are elongated conductors.

6. The invention as claimed in claim 1, wherein said computer is programmed to evaluate, analyze and summarize information about a student's performance over time and in a number of subject areas, and to make the same available to a teacher or other evaluator on command from the computer's memory.

* * * * *